United States Patent
Moon et al.

(10) Patent No.: US 7,860,503 B2
(45) Date of Patent: Dec. 28, 2010

(54) RADIO CONTROL DEVICE, MOBILE STATION, AND MOBILE COMMUNICATION METHOD

(75) Inventors: Sung Uk Moon, Yokohama (JP); Minami Ishii, Yokohama (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 674 days.

(21) Appl. No.: 11/575,993

(22) PCT Filed: Sep. 22, 2005

(86) PCT No.: PCT/JP2005/017525
§ 371 (c)(1),
(2), (4) Date: Dec. 13, 2007

(87) PCT Pub. No.: WO2006/033411
PCT Pub. Date: Mar. 30, 2006

(65) Prior Publication Data
US 2008/0318582 A1     Dec. 25, 2008

(30) Foreign Application Priority Data
Sep. 24, 2004   (JP) .............................. 2004-278461
Feb. 17, 2005   (JP) .............................. 2005-041413

(51) Int. Cl.
*H04W 36/00*   (2009.01)
(52) U.S. Cl. ...................... 455/439; 455/436; 455/438; 455/440

(58) Field of Classification Search ............. 455/435.2, 455/435.3, 432.3, 443–446, 448, 449, 436, 455/438, 439, 440
See application file for complete search history.

(56) References Cited

U.S. PATENT DOCUMENTS

| 2004/0097233 | A1* | 5/2004 | Pecen et al. ................. 455/437 |
| 2005/0202828 | A1* | 9/2005 | Pecen et al. ................. 455/453 |
| 2009/0028113 | A1* | 1/2009 | Moon et al. ................. 370/332 |

FOREIGN PATENT DOCUMENTS

| JP | 11 136736    | 5/1999  |
| JP | 2001 128229  | 5/2001  |
| JP | 2005 525032  | 8/2005  |
| WO | WO 03/096149 A2 | 11/2003 |

OTHER PUBLICATIONS

3GPP TSG-RAN, "TS 25.346 V6.1.0 Introduction of Multimedia Broadcast Multicast Service(MBMS) in Radio Access Network (RAN)", pp. 1-51, 2004.
U.S. Appl. No. 11/199,249, filed Aug. 9, 2005, Moon, et al.

* cited by examiner

*Primary Examiner*—Un C Cho
(74) *Attorney, Agent, or Firm*—Oblon, Spivak, McClelland, Maier & Neustadt, L.L.P.

(57) ABSTRACT

A radio network controller includes a selection decision unit for deciding whether or not the selection of cells to be used by mobile stations after data reception is to be performed, and a mobile station controller for instructing the mobile stations to select cells to use after the data reception according to a result of a decision by the selection decision unit.

8 Claims, 6 Drawing Sheets

RADIO CONTROL DEVICE, MOBILE STATION, AND MOBILE COMMUNICATION METHOD

TECHNICAL FIELD

The present invention relates to a radio network controller, a mobile station, and a mobile communication method.

BACKGROUND ART

Heretofore, a service (Multimedia Broadcast Multicast Service, hereinafter referred to as "MBMS") has been provided in which multimedia contents are transmitted by broadcast or multicast to a plurality of mobile stations (e.g., 3GPP TSG-RAN, "TS25.346 V6.1.0 Introduction of Multimedia broadcast multicast service (MBMS) in Radio access network (RAN)," June). In MBMS, the frequency at which the MBMS data is transmitted, is notified to mobile stations through a Radio Access Network (RAN). Thus, mobile stations which are not currently receiving the MBMS data can also perform frequency handovers to the notified frequency and receive the MBMS data.

DISCLOSURE OF INVENTION

However, mobile stations, which have started using a specific frequency used to transmit MBMS data, stay at the frequency even after receiving the MBMS data unless the communication quality of the frequency deteriorates. Accordingly, traffic is concentrated at a specific frequency, and traffic is distributed unevenly among frequencies. Such a problem is not limited to MBMS. For example, in the case where mobile stations receive data transmitted using a specific frequency as in High Speed Downlink Packet Access (HSDPA) and the like, similar problems may also occur. Traffic locally concentrated as described above results in ineffective utilization of radio resources.

According to one aspect of the present invention, a radio network controller includes a selection decision unit configured to decide whether or not to perform a selection of cells which are used by mobile stations after data reception, and a mobile station controller configured to instruct the mobile stations to select the cells which are used after the data reception, according to a result of a decision by the selection decision unit.

According to one aspect of the present invention, a radio network controller includes a selection decision unit configured to decide whether or not to perform a selection of cells which are allowed to be used by mobile stations after data reception, a cell selector configured to select the cells which are allowed to be used by mobile stations after the data reception, according to a result of a decision by the selection decision unit, and a mobile station controller configured to control the mobile stations to perform wireless communications using the cells selected by the cell selector, after the data reception.

According to one aspect of the present invention, a mobile station includes a wireless communication unit configured to perform a wireless communication, a selection decision unit configured to decide whether or not to perform a selection of a cell which is used after data reception, and a communication controller configured to control the wireless communication unit to select the cell which is used after the data reception, according to a result of a decision by the selection decision unit, and perform the wireless communication using the cell selected, after the data reception.

According to one aspect of the present invention, a mobile communication method includes deciding whether or not to perform a selection of cells which are used by mobile stations after data reception, selecting the cells which are used by the mobile stations after the data reception, and performing wireless communications using the cells selected, after the data reception by the mobile stations.

BEST MODE FOR CARRYING OUT THE INVENTION

First Embodiment

Mobile Communication System

Figure 1:
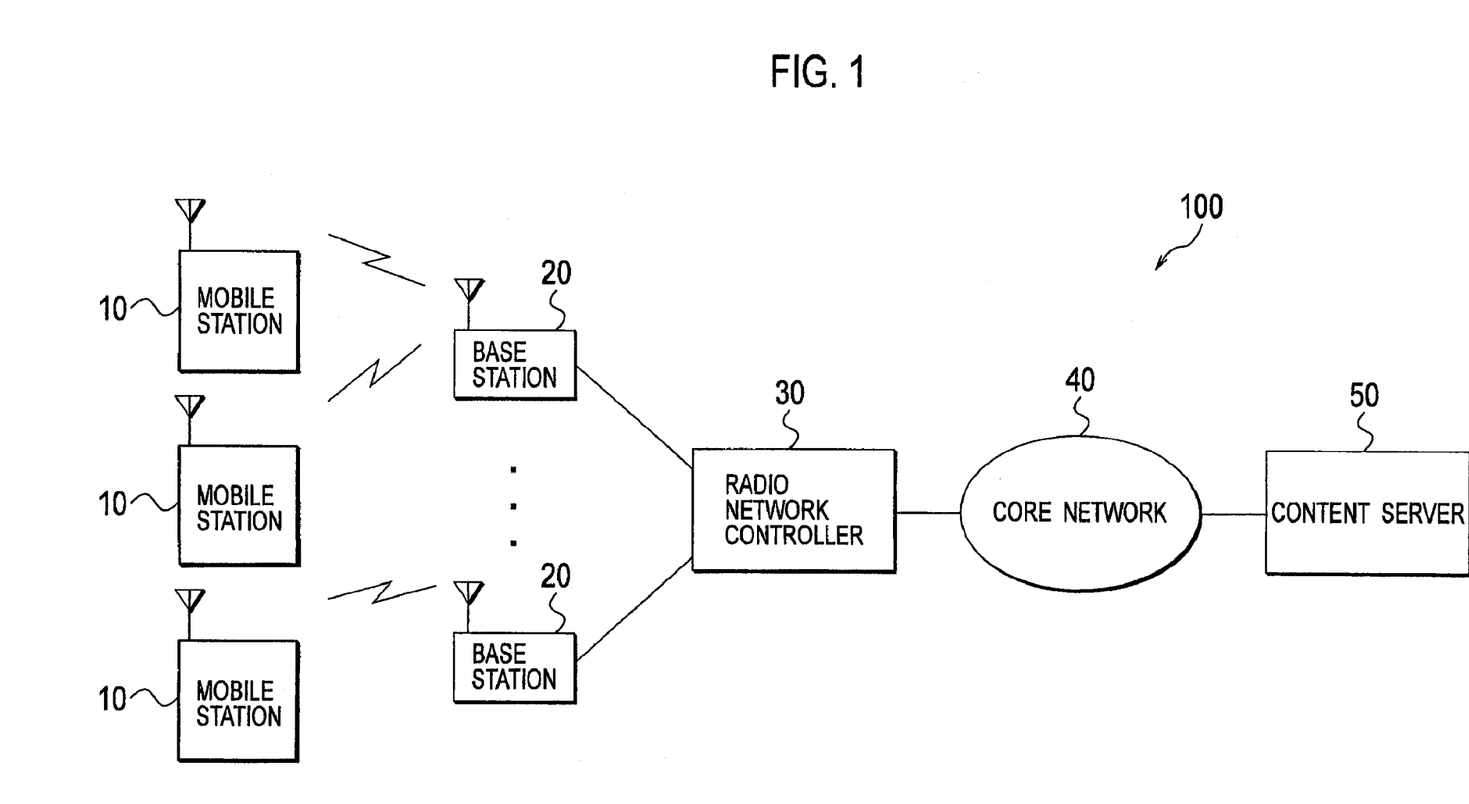
FIG. 1 is a diagram showing the configuration of a mobile communication system according to a first embodiment of the present invention.

As shown in FIG. 1, a mobile communication system 100 includes mobile stations 10, base stations 20, a radio network controller 30, a core network 40, and a content server 50.

The content server 50 provides Multimedia Broadcast Multicast Service (MBMS) in which multimedia contents and the like are transmitted by broadcast or multicast to the plurality of mobile stations 10. The content server 50 broadcasts or multicasts multimedia contents and the like to the plurality of mobile stations 10 through the core network 40, the radio network controller 30, and the base stations 20.

The radio network controller 30 controls wireless communications between the base stations 20 and the mobile stations 10. The base stations 20 and the mobile stations 10 perform wireless communications under the control of the radio network controller 30. The mobile stations 10 transmit and receive data and control signals to/from the radio network controller 30 and the content server 50 through the base stations 20.

The mobile communication system 100 covers a plurality of areas. Each area is divided into a plurality of cells according to location and frequency. In the mobile communication system 100, each area is divided according to a plurality of frequencies and has a structure layered according to the plurality of frequencies. The area divided according to the frequencies is further divided according to location to form a plurality of cells. As described above, the term cell refers to each portion of a communication area divided according to frequency and location.

In the mobile communication system 100 which provides the MBMS, a Frequency Layer Convergence process (FLC process) is performed. The FLC process is a process in which the frequency (hereinafter referred to as a "target frequency") at which the MBMS data is transmitted, is notified to the mobile stations 10, and in which the mobile stations 10 are caused to receive the MBMS data at the target frequency. The FLC process is performed by the radio network controller 30 transmitting a control signal to the mobile stations 10 through the base stations 20. Specifically, the radio network controller 30 notifies the target frequency to the mobile stations 10 by transmitting control signals called Layer Convergence Information (LCI) to the mobile stations 10. The LCI contains offset values between the target frequency and the frequencies (hereinafter referred to as "currently used frequencies") currently used by the mobile stations 10.

Figure 2:
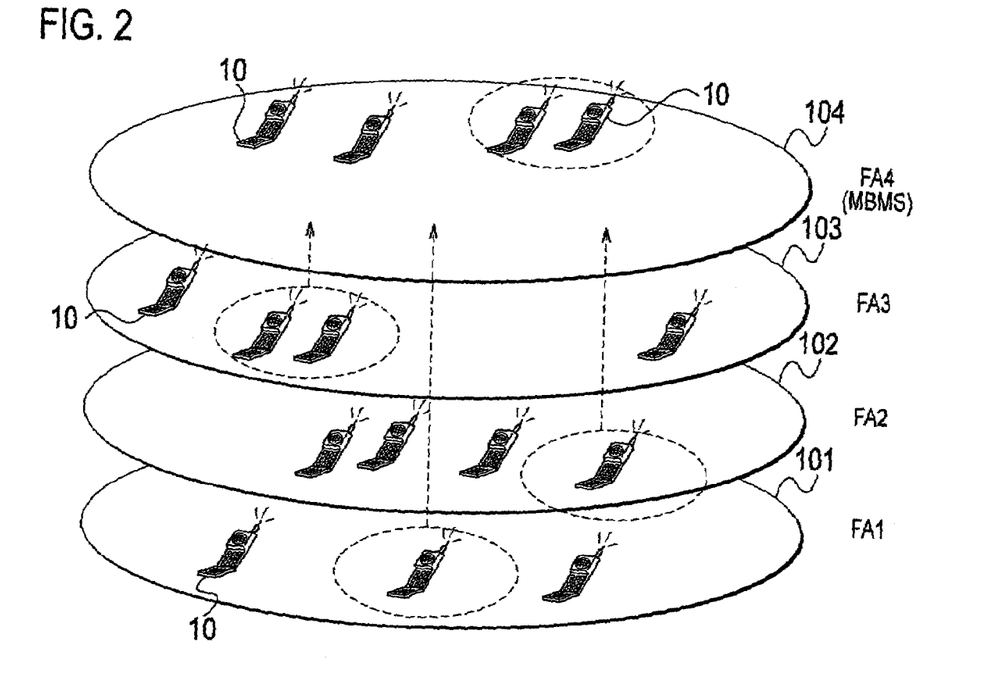
FIG. 2 is a diagram showing a state before frequency handovers in the first embodiment of the present invention.
Figure 3:
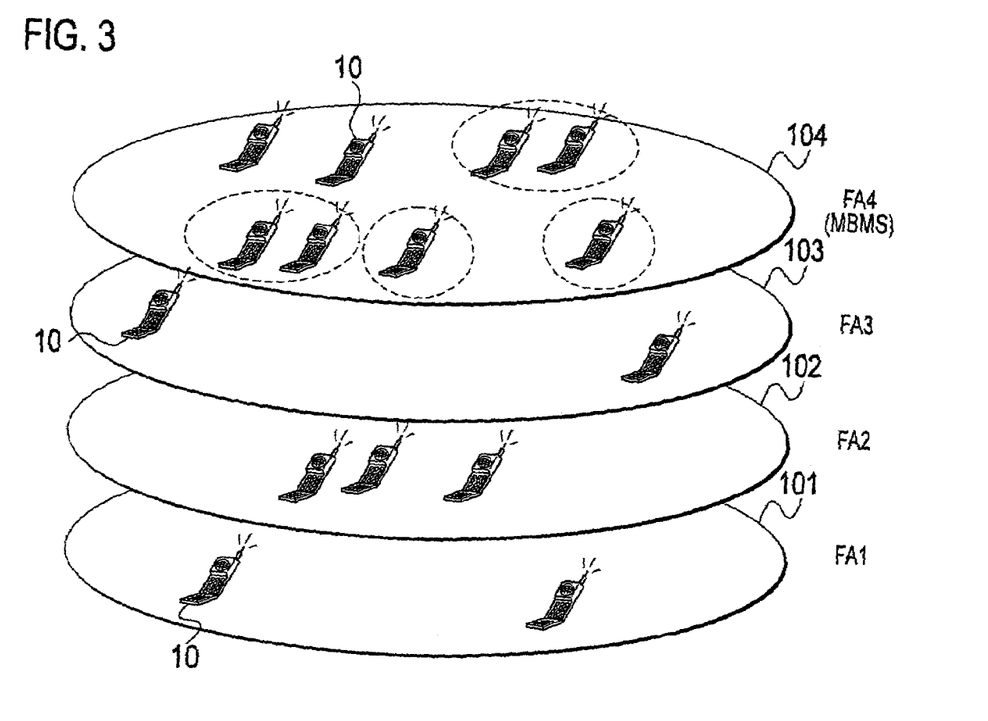
FIG. 3 is a diagram showing a state after frequency handovers in the first embodiment of the present invention.

The FLC process will be descried in detail using FIGS. 2 and 3. In FIGS. 2 and 3, cells 101 to 104 obtained by division according to four frequencies FA1 to FA4 are shown. Though not shown, a plurality of cells differing in location exists for each of the frequencies FA1 to FA4.

Before the MBMS data is transmitted, as shown in FIG. 2, the mobile stations 10 are located in the cells 101 to 104 of the frequencies FA1 to FA4. In the case where the MBMS data is transmitted using the frequency FA4, the radio network controller 30 notifies the target frequency FA4 to the mobile stations 10 through the base stations 20. The radio network controller 30 notifies the target frequency FA4 through the base stations 20 on MBMS Control Channels (MCCHs) of the frequencies FA1 to FA4. The MCCHs are broadcasting control channels for transmitting control signals relating to the MBMS. For example, LCI containing an offset value between the target frequency FA4 and the currently used frequency FA3 is transmitted to the mobile stations 10 located in the cell 103, whereby the target frequency is notified to the mobile stations 10.

The mobile stations 10 (mobile stations surrounded by dotted lines in FIG. 2) which want to receive the MBMS data receive LCI transmitted on the MCCHs. Then, the mobile stations 10 perform frequency handovers to the target frequency FA4. In other words, the mobile stations 10 connect to the base station 20 which covers the cell 104 of the frequency FA4, and start wireless communications using the frequency FA4. As a result of the frequency handovers, as shown in FIG. 3, the mobile stations 10 which want to receive the MBMS data move to the cell 104 of the frequency FA4. Then, the mobile stations 10 receive data provided by the MBMS using the frequency FA4.

Figure 4:
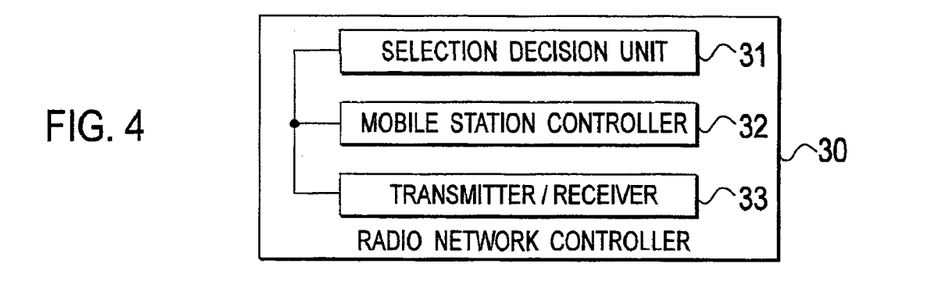
FIG. 4 is a block diagram showing the configuration of a radio network controller according to the first embodiment of the present invention.

Next, the radio network controller 30 and the mobile stations 10 will be described in more detail. As shown in FIG. 4, the radio network controller 30 includes a selection decision unit 31, a mobile station controller 32, and a transmitter/receiver 33. The transmitter/receiver 33 transmits and receives control signals and data to/from the mobile stations 10 through the base stations 20.

The selection decision unit 31 decides whether or not to perform the selection of cells which are used by the mobile stations 10 after data reception. The selection decision unit 31 preferably decides whether or not to perform the selection of cells which are used by the mobile stations 10 after at least one of the reception of data transmitted by multicast, the reception of data transmitted by broadcast, and the reception of data transmitted by a high speed downlink packet access scheme.

This enables the radio network controller 30 to receive data transmitted using a specific frequency or data transmitted to the mobile stations 10 located in a specific location, such as in broadcasting, multicasting, and data transmission by a high speed downlink packet access scheme (HSDPA); and to efficiently prevent traffic concentration in the case where mobile stations concentrated at the specific frequency or location are desired to be dispersed to cells having different frequency or location. Thus, radio resources can be effectively utilized.

The selection decision unit 31 can decide whether or not to perform a selection of a cell, based on at least one of radio resource usage in each cell, the number of mobile stations located in each cell, information (hereinafter referred to as "next transmission information") related to data transmission performed after data reception, a cell usage history of the mobile stations 10, the propagation path state in each cell, and the communication quality in each cell.

Next transmission information includes scheduling information such as data transmission start time, transmission period, and transmission intervals. The cell usage history includes, for example, visiting periods, visiting frequencies, cell usage order, data transmission/reception times, visiting times, and the like for cells to/from which the mobile stations 10 have previously transmitted and received data, cells to/from which the mobile stations 10 are currently transmitting and receiving data, cells in which the mobile stations 10 have previously been on standby, and cells in which the mobile stations 10 are currently on standby.

For example, the selection decision unit 31 can decide not to perform the selection of the cell in the case where radio resources are already utilized evenly or the case where the mobile stations 10 are dispersed evenly. On the other hand, in the case where radio resource usage is uneven or the case where the mobile stations 10 are located in a locally concentrated manner, the selection decision unit 31 decides to perform the selection of the cell. This enables the radio network controller 30 to prevent from performing unnecessary selection of the cell in the case where there is no need to select new cells used by the mobile stations 10 after data reception, such as the case where radio resources are already utilized evenly or the case where the mobile stations 10 are dispersed evenly.

For example, the selection decision unit 31 can decide not to perform the selection of the cell in the case where time until next data transmission performed after data reception is short. On the other hand, in the case where time until next data transmission is sufficiently long, the selection decision unit 31 decides to perform the selection of the cell. This enables the radio network controller 30 to prevent from performing the selection of the cells in the case where newly selecting cells may affect the reception of data transmitted next.

Further, for example, the selection decision unit 31 can decide not to perform the selection of the cell for mobile stations located in the same cell both before and during data reception, mobile stations located in cells having long visiting periods and high visiting frequencies, and mobile stations located in cells having favorable propagation path states and favorable communication qualities. On the other hand, the selection decision unit 31 can decide to perform the selection of the cell for mobile stations located in different cells before and during data reception, mobile stations located in cells having short visiting periods and low visiting frequencies, and mobile stations located in cells having deteriorated propagation path states and deteriorated communication qualities. Thus, the radio network controller 30 does not cause all the mobile stations 10 to perform the selection of the cell, prevents from performing the selection of the cell for mobile stations which have no needs to select the new cells which are used after data reception, and can cause only mobile stations which have needs to select the new cells.

As described above, the selection decision unit 31 may decide whether or not to perform selection on the basis of the overall status of the mobile communication system 100, or may decide whether or not to perform selection for each mobile station 10 on the basis of the status of the respective mobile stations 10.

The selection decision unit 31 can request the base stations 20 through the transmitter/receiver 33 to notify the cell usage history of the mobile stations 10, the radio resource usage in each cell, the number of mobile stations in each cell, the propagation path state of each cell, the communication quality of each cell, and the like. Moreover, the selection decision unit 31 decides the cells which are used by the mobile stations 10 in data reception, on the basis of the cell usage history of the mobile stations 10, and obtains information (hereinafter referred to as "adjacent cell information") related to cells adjacent to the cells used by the mobile stations 10 in data reception. The selection decision unit 31 inputs the result of the decision to the mobile station controller 32. Further, the selection decision unit 31 also inputs the adjacent cell information to the mobile station controller 32.

The mobile station controller 32 controls the mobile stations 10. The mobile station controller 32 instructs the mobile stations 10 to select cells to use after data reception according to the result of the decision by the selection decision unit 31. The mobile station controller 32 obtains the result of the decision from the selection decision unit 31. In the case where the result of the decision indicates to perform the selection, the mobile station controller 32 instructs the mobile stations 10 to perform selection. On the other hand, in the case where the result of the decision indicates not to perform the selection, the mobile station controller 32 does not instruct the mobile stations 10 to perform selection.

The mobile station controller 32 creates a control signal containing a selection instruction that the mobile stations 10 should perform the selection of the cell, and transmits the control signal to the mobile stations 10 through the transmitter/receiver 33. For example, the mobile station controller 32 creates a control signal which contains a selection instruction, transmitted on a radio channel or radio channels such as dedicated channels for the respective mobile stations 10, a common channel for a plurality of mobile stations 10, or a broadcasting control channel.

Figure 5A:
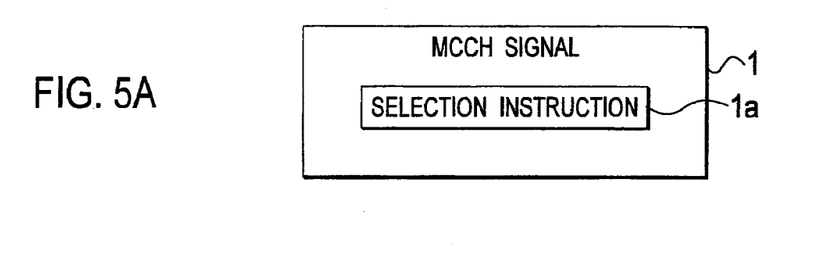
FIG. 5 is a diagram showing an MCCH signal and a BCCH signal according to the first embodiment of the present invention.
Figure 5B:
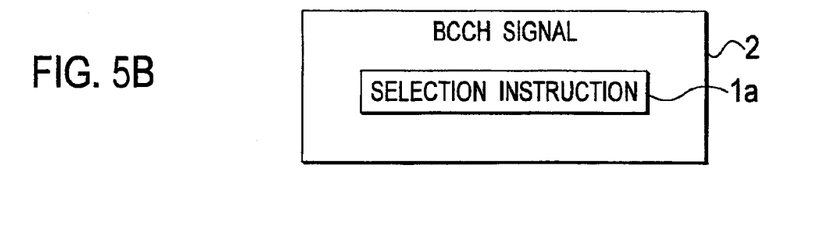

For example, the mobile station controller 32 can create an MCCH signal 1 containing a selection instruction 1a as shown in FIG. 5(a). The MCCH signal 1 is a control signal related to the MBMS transmitted on the MCCHs. Alternatively, the mobile station controller 32 may create a BCCH signal 2 containing the selection instruction 1a as shown in FIG. 5(b). The BCCH signal 2 is a control signal transmitted on a control channel called a Broadcast Control Channel (BCCH). Alternatively, the mobile station controller 32 may create a control signal which contains a selection instruction and which is transmitted on a control channel for HSDPA. The mobile station controller 32 can also incorporate adjacent cell information into a control signal.

The mobile station controller 32 maps the created control signal to an appropriate radio channel. The mobile station controller 32 inputs the created control signal to the transmitter/receiver 33, and causes the transmitter/receiver 33 to transmit the created control signal to the mobile stations 10. The transmitter/receiver 33 transmits the control signal obtained from the mobile station controller 32 to the mobile stations 10 according to instructions from the mobile station controller 32. The mobile station controller 32 causes the control signal containing the selection instruction transmitted to the mobile stations 10 with any one of timings including during standby before data reception, during data reception, and after data reception, thereby instructing the mobile stations 10 to perform selection. Thus, the mobile station controller 32 can easily instruct the mobile stations 10 to perform the selection of the cells by transmitting the control signal containing the selection instruction to the mobile stations 10.

Figure 6:
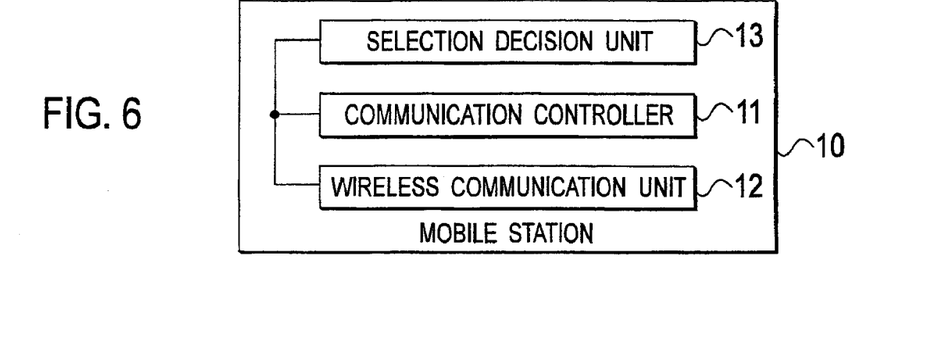
FIG. 6 is a block diagram showing the configuration of a mobile station according to the first embodiment of the present invention.

As shown in FIG. 6, each mobile station 10 includes a communication controller 11, a wireless communication unit 12, and a selection decision unit 13. The wireless communication unit 12 performs a wireless communication with a base station 20. The wireless communication unit 12 receives a control signal transmitted from the radio network controller 30 through the base station 20. The wireless communication unit 12 inputs the received control signal to the communication controller 11 and the selection decision unit 13. The wireless communication unit 12 performs a wireless communication under the control of the communication controller 11.

The selection decision unit 13 decides whether or not to perform the selection of a cell which is used after data reception. The selection decision unit 13 can decide whether or not to perform the selection of a cell which is used after at least one of the reception of data transmitted by multicast, the reception of data transmitted by broadcast, and the reception of data transmitted by a high speed downlink packet access scheme.

The selection decision unit 13 can decide whether or not to perform the selection of a cell, based on an instruction related to the selection of cell from the radio network controller 30. The selection decision unit 13 obtains the control signal from the wireless communication unit 12, and in the case where the control signal contains a selection instruction, decides to perform the selection of the cell. In the case where the control signal does not contain a selection instruction, the selection decision unit 13 decides not to perform the selection of the cell.

Further, the selection decision unit 13 can decide whether or not to perform the selection of the cell based on at least one of the radio resource usage in each cell, the number of mobile stations located in each cell, next transmission information, the cell usage history of the mobile stations 10, the propagation path state in each cell, and the communication quality in each cell.

For example, the selection decision unit 13 can decide to perform the selection of the cell in the case where radio resources are already utilized evenly or the case where the mobile stations 10 are dispersed evenly. On the other hand, in the case where radio resource usage is uneven or the case where the mobile stations 10 are located in a locally concentrated manner, the selection decision unit 13 decides to perform the selection of the cell. This can prevents the mobile stations 10 from unnecessarily performing the selection of the cell in the case where there is no need to newly select cells which are used by the mobile stations 10 after data reception, such as the case where radio resources are already utilized evenly or the case where the mobile stations 10 are dispersed evenly.

For example, the selection decision unit 13 can decide not to perform the selection of the cell in the case where time until next data transmission performed after data reception is short. On the other hand, in the case where time until next data transmission is sufficiently long, the selection decision unit 13 decides to perform the selection of the cell. This can prevent the mobile stations 10 from performing the selection of the cells in the case where newly selecting cells may affect the reception of data transmitted next.

Further, for example, the selection decision unit 13 can decide not to perform the selection of the cell in the case where the mobile station is located in the same cell both before and during data reception, the case where the mobile station 10 is located in a cell having a long visiting period and a high visiting frequency, or the case where the mobile station 10 is located in a cell having a favorable propagation path state and favorable communication quality. On the other hand, the selection decision unit 13 can decide to perform the selection of the cell in the case where the mobile station 10 is located in different cells before and during data reception, or the case where the mobile station 10 is located in a cell having a deteriorated propagation path state and deteriorated communication quality. This can prevent the mobile station 10 from performing the selection of the cell in the case where there is no need to select new cell which is used by the mobile station 10 itself after data reception.

As described above, the selection decision unit 13 may decide whether or not to perform the selection on the basis of the overall status of the mobile communication system 100, or may decide whether or not to perform the selection on the basis of the status of the mobile station 10 itself. The selection decision unit 13 inputs the result of the decision to the communication controller 11.

The communication controller 11 selects a cell which is used after data reception, according to the result of the decision by the selection decision unit 13, and controls the wireless communication unit 12 to perform a wireless communication using the selected cell after data reception. The communication controller 11 obtains the result of the decision from the selection decision unit 13. The communication controller 11 performs the selection of the cell in the case where the result of the decision indicates to perform the selection. On the other hand, in the case where the result of the decision indicates not to perform the selection, the communication controller 11 does not perform the selection of the cell, and enters standby or transmits or receives new data in the current cell.

In the case where the selection of the cell is performed, the communication controller 11 selects a cell which is used after data reception among a plurality of cells. For example, the communication controller 11 can select a cell among cells which have the same frequency as the cell currently used by the mobile station 10 and which neighbor the cell currently used by the mobile station 10, cells which are located in the same location and which have different frequencies, adjacent to cells having different frequencies, and the like.

The communication controller 11 can select a cell which is used after data reception on the basis of at least one of the cell usage history, the radio resource usage in each cell, the number of mobile stations located in each cell, the propagation path state of each cell, adjacent cell information, and the communication quality of each cell.

For example, the communication controller 11 can select, as a cell which is used after data reception, a cell having the same frequency as the cell that it has used immediately before the data reception. This enables the mobile station 10 to return to the frequency which it has used immediately before the data reception. Alternatively, the communication controller 11 can select a cell having a long visiting time and a high visiting frequency. For example, the communication controller 11 can select, as a cell which is used after data reception, a cell which has the same frequency as the cell that it has used immediately before the data reception and which can be used in the current location of the mobile station 10. The communication controller 11 can also select a cell randomly. This can reduce the control load on the mobile station 10.

It should be noted that the selection decision unit 13 and the communication controller 11 can request the base station 20 through the wireless communication unit 12 to notify the cell usage history, the radio resource usage in each cell, the number of mobile stations located in each cell, the propagation path state of each cell, the communication quality of each cell, and the like. The communication controller 11 can obtain adjacent cell information from a control signal transmitted from the radio network controller 30.

Further, the communication controller 11 may give usage priorities to cells. The communication controller 11 can set priorities on the basis of at least one of the cell usage history, the radio resource usage in each cell, the number of mobile stations located in each cell, the propagation path state of each cell, the adjacent cell information, and the communication quality of each cell.

Alternatively, the communication controller 11 may set priorities randomly. For example, the communication controller 11 can randomly select a first candidate for selection among cells having a frequency which the mobile station 10 can use, and give a highest priority to the cell. The communication controller 11 can similarly randomly select cells as second and other candidates for selection, thereby giving priorities to cells in order.

Moreover, the communication controller 11 may set a priority using an identifier unique to the mobile station 10 and a value calculated by the following Equation (1):

$$\text{Mobile Station's Identifier mod } N \qquad \text{Equation (1)}$$

where N is the number of cells which the mobile station can use. As the identifier unique to the mobile station 10, for example, an International Mobile Subscriber Identity (IMSI) or the like can be used. The communication controller 11 beforehand holds a table of correspondence between a value calculated by Equation (1) and the identifier (cell ID) for identifying a cell. Further, the communication controller 11 calculates Equation (1), and refers to the correspondence table on the basis of the calculated value to select the cell having the cell ID corresponding to the calculated value.

In this case, the communication controller 11 can select a cell which is used according to priority. For example, the communication controller 11 predetermines required values regarding the radio resource usage in each cell, the number of mobile stations located in each cell, the propagation path is state of each cell, the communication quality of each cell, and the like. Then, for each cell, in decreasing order of priority, the communication controller 11 checks whether or not the radio resource usage in the cell, the number of mobile stations located in the cell, the propagation path state of the cell, the communication quality of the cell, and the like satisfy the required values. When the communication controller 11 has detected a cell satisfying the required values, the communication controller 11 selects the cell as a using cell.

For example, a description will be given for the case where the communication controller 11 give priorities to cells in the order of the cells having frequencies FA3, FA2, FA4, and FA1 using any one of the above-described methods, i.e., the case where the cell having the frequency FA3 is given the highest priority and the cell having the frequency FA1 is given the lowest priority.

First, the communication controller 11 checks the communication quality, the propagation path state, and the like of the cell having the frequency FA3 and the highest priority, and decides whether or not the cell having the frequency FA3 satisfies the required values. In the case where the required values are satisfied, the communication controller 11 selects the cell having the frequency FA3. On the other hand, in the case where the required values are not satisfied, the communication controller 11 similarly decides whether or not the cell having the frequency FA2 and the second highest priority satisfies the required values. In this way, the communication controller 11 checks the status of the cells in the order of set priorities until a cell having a frequency which satisfies the required values is found.

The communication controller 11 controls the wireless communication unit 12 to enter standby or start the transmission or reception of new data using the selected cell after data reception. The communication controller 11 preferably selects a cell which is used after at least one of the reception of data transmitted by multicast, the reception of data transmitted by broadcast, and the reception of data transmitted by a high speed downlink packet access scheme.

For example, as shown in FIG. 3, the mobile station 10 receives data provided by the MBMS in the cell 104 using the frequency FA4. In the case where the communication controller 11 has selected, for example, the cell 103 as a cell which is used after the reception of the MBMS data, the communication controller 11 instructs the wireless communication unit 12 to perform a frequency handover to the frequency FA3. The wireless communication unit 12 connects to the base station 20 which covers the cell 103 having the frequency FA3, and starts a wireless communication using the frequency FA3.

Figure 7:
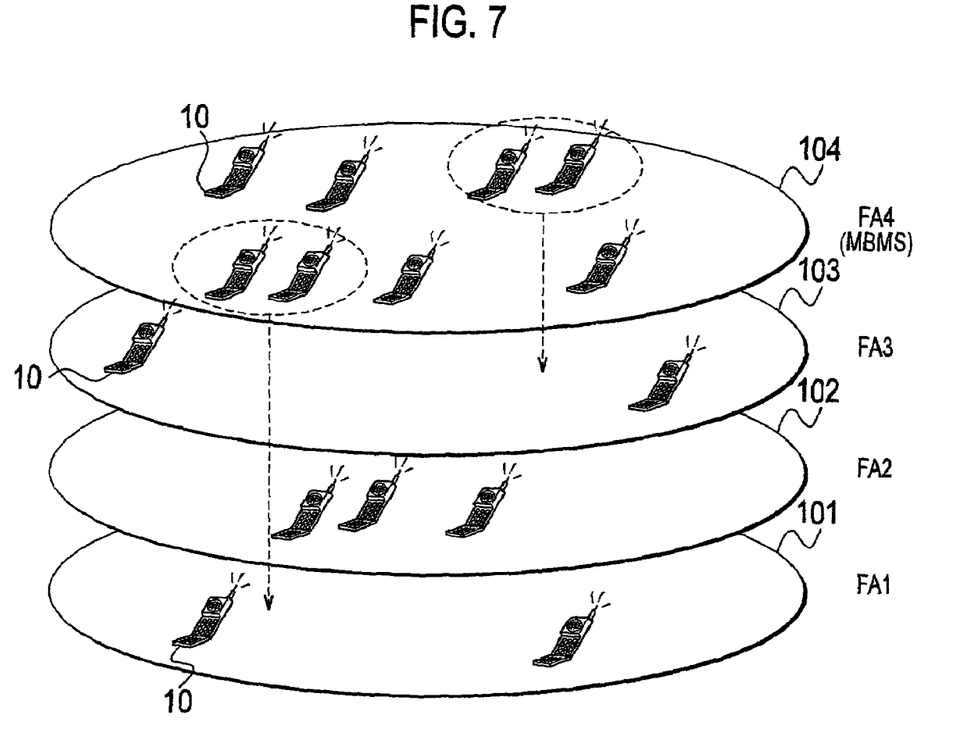
FIG. 7 is a diagram showing a state after data reception in the first embodiment of the present invention.

Thus, for example, shown in FIG. 7, some mobile stations 10 (mobile stations surrounded by dotted lines in FIG. 7) are shifted from the cell 104 to the cells 103 and 101 after the reception of the MBMS data, whereby the mobile stations 10 are dispersed. The communication controllers 11 of the mobile stations 10 select cells which are used by the mobile stations 10 after the data reception so that traffic is not concentrated at one cell but is dispersed to each cell as shown in FIG. 7.

(Mobile Communication Method)

Figure 8:
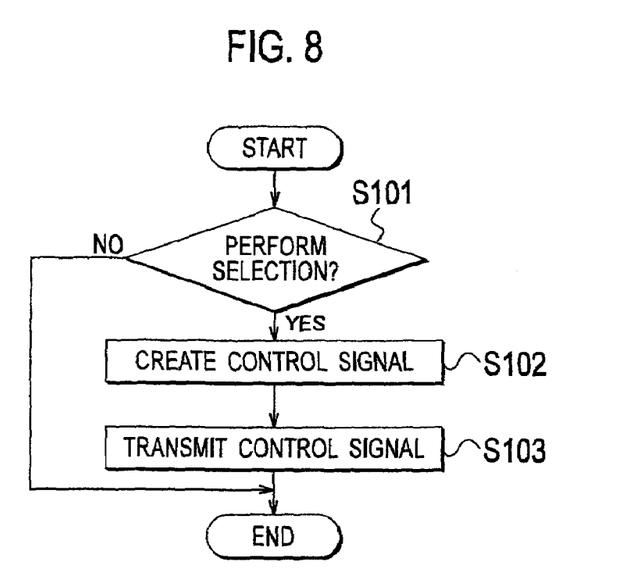
FIG. 8 is a flowchart showing an operation procedure of the radio network controller according to the first embodiment of the present invention.

Next, a mobile communication method in the mobile communication system 100 will be described. In FIG. 8, an operation procedure of the radio network controller 30 is shown. The radio network controller 30 decides whether or not to perform the selection of the cells which are used by the mobile stations 10 after data reception (S101). If it is decided to perform the selection, the radio network controller 30 creates a control signal containing a selection instruction (S102). The radio network controller 30 transmits the created control signal to the mobile stations 10 through the base stations 20 (S103). On the other hand, if it is decided in step (S101) not to perform the selection, the radio network controller 30 does not create a control signal containing a selection instruction, and terminates processing.

Figure 9:
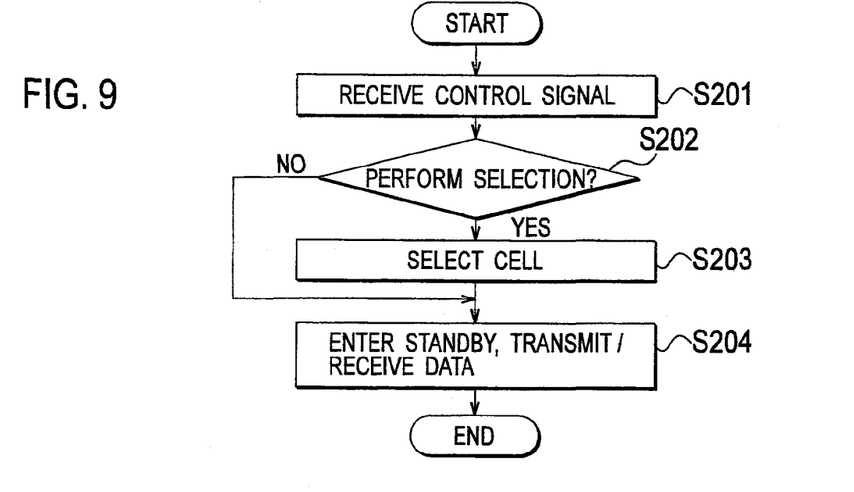
FIG. 9 is a flowchart showing an operation procedure of the mobile station according to the first embodiment of the present invention.

In FIG. 9, an operation procedure of the mobile station 10 is shown. The mobile station 10 receives a control signal from the radio network controller 30 through the base station 20 (S201). On the basis of the received control signal, the mobile station 10 decides whether or not to perform the selection of the cell which is used by the mobile station 10 after data reception (S202). If it is decided to perform the selection, the mobile station 10 selects a cell to use after the data reception (S203). After the data reception, the mobile station 10 enters standby or transmits or receives new data using the selected cell (S204).

On the other hand, if it is decided in step (S202) not to perform the selection, the mobile station 10 does not perform the selection, and proceeds to step (S204) to enter standby or to transmit or receive new data in the current cell.

According to the mobile communication system 100, the radio network controller 30, the mobile stations 10, and the mobile communication method such as described above, the radio network controller 30 decides whether or not to perform the selection of the cells which are used by the mobile stations 10 after data reception, and can cause the mobile stations 10 to select cells which are used after the data reception only in the case where the selection should be performed. Accordingly, the radio network controller 30 can prevent the mobile stations 10 from performing unnecessary selection of the cell. Thus, the radio network controller 30 can efficiently disperse the mobile stations 10 to a plurality of cells after the data reception, and efficiently prevent traffic concentration, whereby radio resources can be effectively utilized.

Moreover, the mobile station 10 decides whether or not to perform the selection of a cell which is used by the mobile station 10 after the data reception, and can select the cell which is used after the data reception only in the case where the selection should be performed. Further, in the case where a cell has newly been selected, the mobile station 10 can perform a wireless communication using the cell selected after the data reception. Accordingly, the mobile station 10 can be prevented from performing unnecessary selection of the cell. Thus, the mobile stations 10 can be efficiently dispersed to a plurality of cells after the data reception, and traffic concentration can be efficiently prevented, whereby radio resources can be effectively utilized.

For example, in the case where the mobile stations 10 receive data transmitted using a specific frequency or data transmitted to mobile stations located in a specific location as in the reception of the MBMS data or the reception of data by HSDPA, the mobile stations 10 concentrated at the specific frequency or location can be efficiently dispersed as evenly as possible to cells differing in frequency or location after the data reception. Accordingly, traffic can be prevented from being concentrated at a specific frequency or location, and the effective utilization of radio resources can be expected.

Second Embodiment

Figure 10:
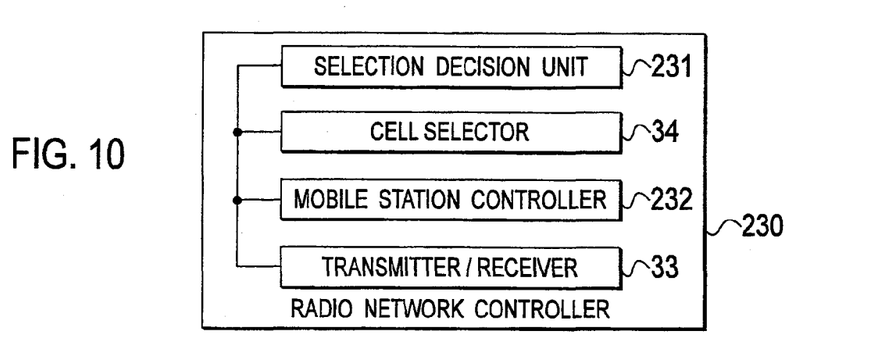
FIG. 10 is a block diagram showing the configuration of a radio network controller according to a second embodiment of the present invention.

In this embodiment, in the mobile communication system 100 shown in FIG. 1, a radio network controller 230 shown in FIG. 10 is used instead of the radio network controller 30. The radio network controller 230 includes a selection decision unit 231, a mobile station controller 232, a transmitter/receiver 33, and a cell selector 34.

The selection decision unit 231 decides whether or not to perform the selection of cells which are allowed to be used by the mobile stations 10 after data reception. The selection decision unit 231 can decide whether or not to perform the selection of the cells, as in the selection decision unit 31 shown in FIG. 4. In other words, the selection decision unit 231 can decide whether or not to perform the selection of cells which are used by the mobile stations 10, after at least one of the reception of data transmitted by multicast, the reception of data transmitted by broadcast, and the reception of data transmitted by a high speed downlink packet access scheme.

Further, the selection decision unit 231 can decide whether or not to perform the selection of cells, based on at least one of radio resource usage in each cell, the number of mobile stations located in each cell, next transmission information, a cell usage history of the mobile stations 10, the propagation path state in each cell, and the communication quality in each cell. The selection decision unit 231 inputs the result of the decision to the cell selector 34.

The cell selector 34 selects cells which are allowed to be used by the mobile stations 10 after data reception according to the result of the decision by the selection decision unit 231. The cell selector 34 obtains the result of the decision from the selection decision unit 231. The cell selector 34 performs the selection of the cell in the case where the result of the decision indicates to perform the selection. On the other hand, in the case where the result of the decision indicates not to perform the selection, the cell selector 34 does not perform the selection of the cell.

The cell selector 34 preferably selects cells which are allowed to be used by the mobile stations 10 after at least one of the reception of data transmitted by multicast, the reception of data transmitted by broadcast, and the reception of data transmitted by a high speed downlink packet access scheme. This enables the radio network controller 230 to receive data transmitted using a specific frequency or data transmitted to the mobile stations located in a specific location as in broadcasting, multicasting, and data transmission by a high speed downlink packet access scheme (HSDPA); and to disperse mobile stations concentrated at the specific frequency or location to cells differing in frequency or location.

The cell selector 34 selects a cell which is allowed to be used by the mobile station 10 after data reception among a plurality of cells. For example, the cell selector 34 can select a cell among cells which have the same frequency as the cell currently used by the mobile station 10 and which are adjacent to the cell currently used by the mobile station 10, cells which are located in the same location and have different frequencies, cells which are adjacent to and have different frequencies, and the like.

For example, the cell selector 34 can select cells after data reception on the basis of at least one of the cell usage history of the mobile stations 10, the radio resource usage in each cell, the number of mobile stations located in each cell, the propagation path state of each cell, adjacent cell information, and the communication quality of each cell. This enables the radio network controller 230 to more appropriately disperse the mobile stations 10 in consideration of these pieces of information. Thus, radio resources can be more effectively utilized. The cell selector 34 can also select cells randomly. This can reduce the control load on the radio network controller 230.

In the case where a cell is selected based on the cell usage history, the cell selector 34 preferably selects, as a cell which is allowed to be used by the mobile station 10 after data reception, a cell having the same frequency as the cell in which the mobile station 10 has been located immediately before the data reception and which has been used by the mobile station 10 immediately before the data reception. This enables the radio network controller 230 to return the mobile station 10 to the frequency used immediately before the data reception. For example, the cell selector 34 can select, as a cell which is allowed to be used after data reception, a cell which having the same frequency as the cell that has been used by the mobile station 10 immediately before the data reception and which can be used in the current location of the mobile station 10. Further, the cell selector 34 can also select a cell having a long visiting period and a high visiting frequency.

The cell selector 34 can request the base stations 20 through the transmitter/receiver 33 to notify the cell usage history of the mobile stations 10, the radio resource usage in each cell, the number of mobile stations in each cell, the propagation path state of each cell, the communication quality of each cell, and the like. Moreover, the cell selector 34 can decide the cells which are used by the mobile stations 10 in data reception, on the basis of the cell usage history of the mobile stations 10, and can obtain adjacent cell information.

The cell selector 34 may select one cell or may select a plurality of cells as candidates. In the case where a plurality of cells is selected, the cell selector 34 may set usage priorities. For example, the cell selector 34 can set priorities on the basis of at least one of the cell usage history of the mobile station 10, the radio resource usage in each cell, the number of mobile stations located in each cell, the propagation path state of each cell, adjacent cell information, and the communication quality of each cell.

Alternatively, the cell selector 34 may set priorities randomly. For example, the cell selector 34 can randomly select a first candidate for selection among cells having frequencies which the mobile station 10 can use, and give a highest priority to the cell. The cell selector 34 can similarly randomly determine second and other candidates, and give priorities to the cells in order. Moreover, the cell selector 34 may set priorities using an identifier unique to the mobile station 10 and the value calculated by the aforementioned Equation (1). In this case, the cell selector 34 beforehand holds a table of correspondence between a value calculated by Equation (1) and a cell ID.

Moreover, for a plurality of mobile stations 10, the cell selector 34 can select a cell which is allowed to be used after data reception, and set for the selected cell the proportion (hereinafter referred to as a "mobile station proportion") of mobile stations which should use the cell. For example, the cell selector 34 can set the mobile station proportion of the cell 101 to 40%, the mobile station proportion of the cell 102 to 20%, the mobile station proportion of the cell 103 to 30%, and the mobile station proportion of the cell 104 to 10%. The cell selector 34 can set a high mobile station proportion for a cell which is desired to be used by many mobile stations, e.g., in which there are many available radio resources, in which the number of mobile stations located therein is small, in which the propagation path state is favorable, or in which the communication quality is favorable. On the other hand, the cell selector 34 can set a low mobile station proportion for a cell which can be used by few mobile stations, e.g., in which there are few available radio resources, in which the number of mobile stations located therein is large, or in which the propagation path state or the communication quality is deteriorated.

This enables the radio network controller 230 to cause many mobile stations to use a cell which is desired to be used by many mobile stations, and to reduce the number of mobile stations using a cell which few mobile stations can use. Accordingly, the radio network controller 230 can appropriately disperse the mobile stations 10.

The cell selector 34 may select a cell for each mobile station 10, may select a common cell for each specific mobile station group, or may select a common cell for all the mobile stations which have received data transmitted by the MBMS or data transmitted by HSDPA.

The cell selector 34 inputs information (hereinafter referred to as "selected cell information") related to the selected cell or cells to the mobile station controller 232. As the selected cell information, for example, an identifier (cell ID) for identifying each cell, an identifier (base station ID) of the base station which covers each cell, control information for receiving a signal in each cell, the frequency of each cell, location information on each cell, and the like can be used. One of these pieces of information may be used singly, or some of them may be used in combination. As the frequency of each cell, for example, the absolute value (2.0 GHz or the like) of the frequency of each selected cell or a relative value (offset value or the like indicates the frequency of each selected cell with respect to the currently used frequency) of the frequency of each selected cell can be used. Further, the selected cell information can include priorities, mobile station proportions, and the like. Moreover, the cell selector 34 also inputs adjacent cell information to the mobile station controller 232.

The mobile station controller 232 controls the mobile stations 10 to perform wireless communications using the cell or cells selected by the cell selector 34, after data reception. The mobile station controller 232 creates control signals for notifying the selected cell or cells to the mobile stations 10, and transmits the control signals to the mobile stations 10 through the transmitter/receiver 33. In this way, the mobile station controller 232 notifies the selected cell or cells to the mobile stations 10 and controls the mobile stations 10.

The mobile station controller 232 creates control signals using the selected cell information obtained from the cell selector 34. For example, the mobile station controller 232 creates control signals which contain the selected cell information and which are transmitted on a radio channel or radio channels such as dedicated channels for the respective mobile stations 10, a common channel for a plurality of mobile stations 10, or a broadcasting control channel.

Figure 11A:
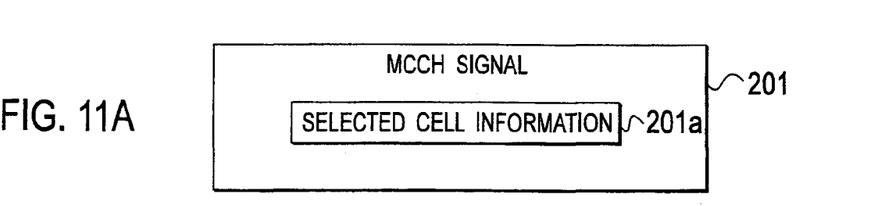
FIG. 11 is a diagram showing an MCCH signal and a BCCH signal according to a second embodiment of the present invention.
Figure 11B:
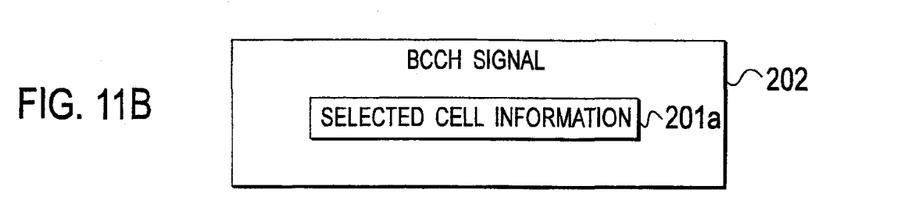

For example, the mobile station controller 232 can create an MCCH signal 201 containing selected cell information 201a as shown in FIG. 11(a). Alternatively, the mobile station controller 232 may create a BCCH signal 202 containing the selected cell information 201a as shown in FIG. 11(b). Alternatively, the mobile station controller 232 may create a control signal which contains the selected cell information and which is transmitted on a control channel for HSDPA. The mobile station controller 232 can also incorporate adjacent cell information into a control signal.

The mobile station controller 232 maps the created control signals to appropriate radio channels. The mobile station controller 232 inputs the created control signals to the transmitter/receiver 33, and causes the transmitter/receiver 33 to transmit the created control signals to the mobile stations 10. The transmitter/receiver 33 transmits the control signals obtained from the mobile station controller 232 to the mobile stations 10 according to instructions from the mobile station controller 232. The mobile station controller 232 causes the control signals containing the selected cell information transmitted to the mobile stations 10 with any one of timings including during standby before data reception, during data reception, and after data reception, thereby notifying the selected cell information to the mobile stations 10. Thus, the mobile station controller 232 can easily control the mobile stations 10 so that the mobile stations 10 use the selected cell or cells after data reception, by transmitting to the mobile stations 10 the control signals containing the selected cell information related to the cell or cells used after the data reception.

In the case where the above-described radio network controller 230 is used, the selection decision unit 13 of the mobile station 10 shown in FIG. 6 can decide whether or not to perform the selection of the cell, based on an instruction related to the selection of cell from the radio network controller 230. In the case where the control signal contains selected cell information, the selection decision unit 13 decides to perform the selection of the cell. In the case where the control signal does not contain selected cell information, the selection decision unit 13 decides not to perform the selection of the cell. The selection decision unit 13 inputs the result of the decision and the selected cell information to the communication controller 11.

The communication controller 11 can select a cell which is used, based on the result of the radio network controller 230 selecting a cell which is used after data reception. The communication controller 11 controls the wireless communication unit 12 on the basis of the selected cell information from the radio network controller 230. This enables the mobile station 10 to easily control the wireless communication unit 12 using the result of the selection by the radio network controller 230. The communication controller 11 obtains the selected cell information from the selection decision unit 13.

In the case where the selected cell information designates one cell, the communication controller 11 determines the cell which is used after data reception. In the case where the selected cell information designates a plurality of cells, the communication controller 11 can select a cell which is used after data reception among the plurality of cells selected by the radio network controller 230, on the basis of at least one of the cell usage history, the radio resource usage in each cell, the number of mobile stations located in each cell, the propagation path state of each cell, adjacent cell information related to cells adjacent to the cell used during data reception, the communication quality of each cell, and the like. This makes it possible to more appropriately disperse the mobile stations 10 in consideration of these pieces of information and to more effectively utilize radio resources. The communication controller 11 can also randomly select a cell which is used among the cell candidates notified. This can reduce the control load on the mobile station 10.

Moreover, in the case where the selected cell information contains the priorities of cells, the communication controller 11 can select a cell which is used according to the priorities. For example, for each cell, in decreasing order of the notified priorities, the communication controller 11 checks whether or not the radio resource usage in the cell, the number of mobile stations located in the cell, the propagation path state of the cell, the communication quality of the cell, and the like satisfy required values. When a cell satisfying the required values is detected, the communication controller 11 selects the cell as a using cell.

For example, in the case where the cell using the frequency FA1 and the cell using the frequency FA2 are notified as candidates for a cell which is used after data reception, and where the cell having the frequency FA1 has a higher priority than the cell having the frequency FA2, the communication controller 11 first checks the communication quality and the like of the cell is having the frequency FA1. If the cell having the frequency FA1 satisfies the required values, the communication controller 11 selects the cell having the frequency FA1. On the other hand, in the case where the cell having the frequency FA1 does not satisfy the required values, the communication controller 11 makes a check on the cell having the frequency FA2. It should be noted that the communication controller 11 may give priorities to the notified cell candidates by itself.

In the case where the selected cell information contains mobile station proportions, the communication controller 11 can select a cell which is used after data reception on the basis of the mobile station proportions. The communication controller 11 can select a cell having a high mobile station proportion preferentially.

Figure 12:
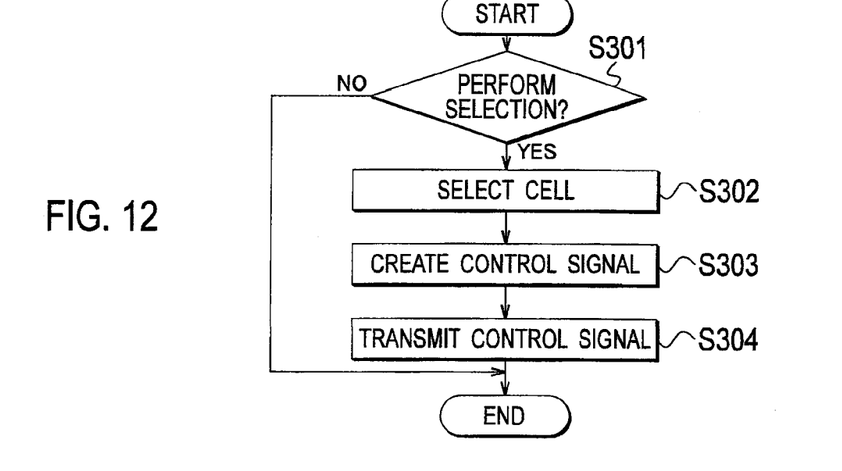
FIG. 12 is a flowchart showing an operation procedure of the radio network controller according to the second embodiment of the present invention.

Next, an operation procedure of the radio network controller 230 is shown in FIG. 12. The radio network controller 230 decides whether or not to perform the selection of cells which are allowed to be used by the mobile stations after data reception (S301). In the case where it is decided to perform the selection, the radio network controller 230 selects cells to which are allowed to be used by the mobile stations 10 after the data reception (S302). The radio network controller 230 creates control signals containing selected cell information (S303). The radio network controller 230 transmits the created control signals to the mobile stations 10 through the base stations 20 (S304). On the other hand, in the case where it is decided in step (S301) not to perform selection, the radio network controller 230 does not select cells, and terminates processing.

The above-described radio network controller 230 makes it possible to decide whether or not cells which are allowed to be used by the mobile stations 10 after data reception are selected, and makes it possible to select cells which are allowed to be used by the mobile stations 10 after data reception only in the case where selection should be performed. Further, the radio network controller 230 can cause the mobile stations 10 to use the selected cells. Accordingly, the radio network controller 230 can prevent from performing unnecessary selection of the cell. Thus, the radio network controller 230 can efficiently disperse mobile stations to a plurality of cells after data reception, and efficiently prevent traffic concentration, whereby radio resources can be effectively utilized.

Modified Examples

Figure 13:
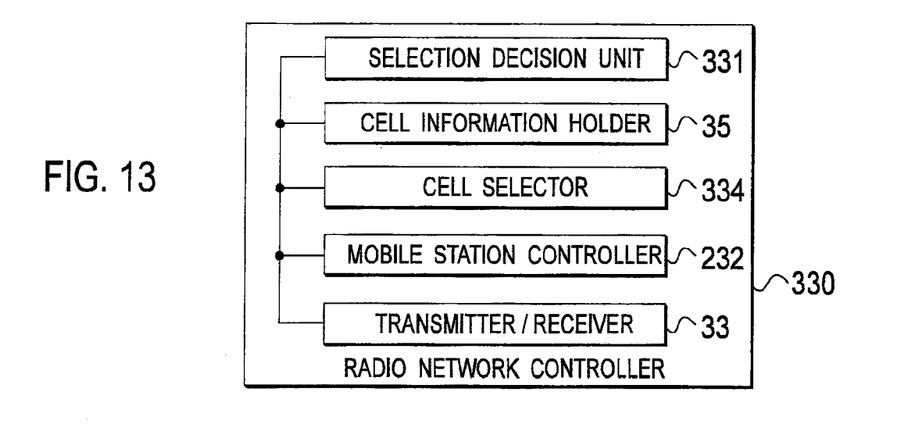
FIG. 13 is a block diagram showing the configuration of a radio network controller according to a modified example of the present invention.

The present invention is not limited to the above-described embodiments, and can be modified variously. For example, a radio network controller 330 shown in FIG. 13 may be used. The radio network controller 330 includes a cell information holder 35, a selection decision unit 331, a cell selector 334, a mobile station controller 232, and a transmitter/receiver 33. The cell information holder 35 holds a cell usage history for each mobile station 10. In this case, by referring to the cell information holder 35, the selection decision unit 331 and the cell selector 334 can decide whether or not to perform the selection of the cell and can perform the selection of the cell. This enables the radio network controller 330 to easily perform the selection of the cell using the usage histories. The selection decision unit 331 stores usage histories obtained from the base stations 20 in the cell information holder 35.

Figure 14:
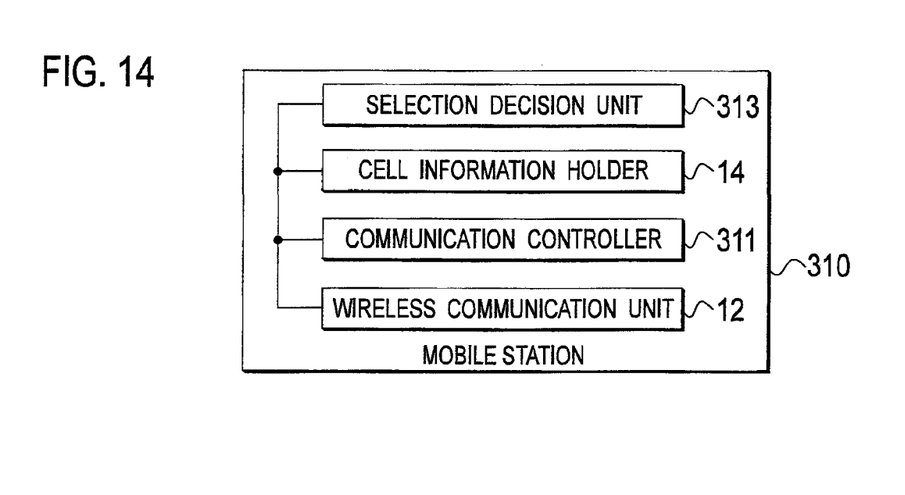
FIG. 14 is a block diagram showing the configuration of a mobile station according to a modified example of the present invention.

Moreover, a mobile station 310 shown in FIG. 14 may be used. The mobile station 310 includes a cell information holder 14, a selection decision unit 313, a communication controller 311, and a wireless communication unit 12. The cell information holder 14 holds a cell usage history of the mobile station 310 itself. In this case, by referring to the cell information holder 14, the selection decision unit 313 and the communication controller 311 can decide whether or not to perform the selection of the cell and can perform the selection of the cell. The communication controller 311 stores the usage history of the mobile station 310 itself in the cell information holder 14. Thus, by referring to the cell information holder 14, the mobile station 310 can decide whether or not to perform the selection of the cell and can perform the selection of the cell by itself. It should be noted that the cell information holders 35 and 14 may hold information and the like other than usage histories obtained from the base stations 20.

Furthermore, the cell selector 34 may determine a banned frequency which is banned for use by the mobile stations 10 after data reception, and select, as a cell which is allowed to be used after the data reception, a cell having a frequency other than the banned frequency. In this case, the mobile station controller 232 can notify the banned frequency to the mobile stations 10 and thereby control the mobile stations 10 to perform wireless communications using cells having frequencies other than the banned frequency, after the data reception. This enables the radio network controller 230 to determine a banned frequency which is banned for use by the mobile stations 10 after data reception, and to cause the mobile stations 10 to use cells having frequencies other than the banned frequency. Accordingly, the radio network controller 230 can disperse the mobile stations 10 to cells having frequencies other than the frequency which the radio network controller 230 does not want the mobile stations 10 to use after data reception, and can prevent traffic concentration. Thus, radio resources can be effectively utilized. For example, the cell selector 34 can determine the banned frequency on the basis of frequency usage. For example, the mobile station controller 232 can notify the banned frequency to the mobile stations 10 by creating a control signal such as an MCCH signal or a BCCH signal containing the banned frequency as in the case where cell selection information is notified.

In this case, the communication controllers 11 of the mobile stations 10 can select, as cells which is used after data reception, cells having frequencies other than the banned frequency determined by the radio network controller 230. This makes it possible to disperse the mobile stations 10 to cells having frequencies other than the frequency which the radio network controller 230 does not want the mobile stations 10 to use after the data reception. The communication controllers 11 obtain a control signal containing the banned frequency as in the case of cell selection information. Further, the communication controllers 11 can select, as cells to be used, cells having frequencies other than the banned frequency contained in the control signal.

The invention claimed is:

1. A radio network controller comprising:
   a selection decision unit configured to decide whether to perform a selection of cells which are used by mobile stations after at least one of reception of data transmitted by broadcast at a specific cell, reception of data transmitted by multicast at the specific cell, and reception of data transmitted by a high speed downlink packet access scheme at the specific cell, and select the cells used by mobile stations after data reception at the specific cell based on at least one of radio resource usage in each of the cells and a number of mobile stations located in each of the cells when the selection decision unit decides to perform the selection of cells; and
   a mobile station controller configured to instruct the mobile stations to select the cells which are used after the data reception at the specific cell, according to a result of a decision and a selection by the selection decision unit.

2. The radio network controller according to claim 1, wherein the selection unit is configured to select the cells used by the mobile stations after data reception at the specific cell based on a proportion of mobile stations to be allocated to each cell including the selected cell.

3. A radio network controller comprising:
a selection decision unit configured to decide whether to perform a selection of cells which are allowed to be used by mobile stations after at least one of reception of data transmitted by broadcast at a specific cell, reception of data transmitted by multicast at the specific cell, and reception of data transmitted by a high speed downlink packet access scheme at the specific cell;
a cell selector configured to select the cells which are allowed to be used by mobile stations after the data reception at the specific cell based on at least one of radio resource usage in each cell and a number of mobile stations located in each cell, according to a result of a decision by the selection decision unit; and
a mobile station controller configured to control the mobile stations to perform wireless communications using the cells selected by the cell selector, after the data reception at the specific cell.

4. The radio network controller according to claim 3, wherein
the cell selector is configured to select the cells which are allowed to be used by the mobile stations after data reception at the specific cell based on a proportion of mobile stations to be allocated to each cell including the selected cell.

5. A mobile station comprising:
a wireless communication unit configured to perform a wireless communication;
a selection decision unit configured to decide whether to perform a selection of a cell which is used after at least one of reception of data transmitted by broadcast at a specific cell, reception of data transmitted by multicast at the specific cell, and reception of data transmitted by a high speed downlink packet access scheme at the specific cell; and
a communication controller configured to control the wireless communication unit to select the cell which is used after the data reception based on at least one of radio resource usage in each cell and a number of mobile stations located in each cell, according to a result of a decision by the selection decision unit, and perform the wireless communication using the cell selected, after the data reception.

6. The mobile station according to claim 5, wherein, the selection decision unit decides whether to perform the selection of the cell, based on an instruction related to the selection of the cell from a radio network controller.

7. The mobile station according to claim 5, wherein
the selection unit is configured to select the cell to be used by the mobile station after data reception at the specific cell based on a proportion of mobile stations to be allocated to each cell including the selected cell.

8. A mobile communication method comprising:
deciding whether to perform a selection of cells which are used by mobile stations at least one of reception of data transmitted by broadcast at a specific cell, reception of data transmitted by multicast at the specific cell, and reception of data transmitted by a high speed downlink packet access scheme at the specific cell;
selecting the cells which are used by the mobile stations after the data reception at the specific cell based on at least one of radio resource usage in each cell and a number of mobile stations located in each cell; and
performing wireless communications using the cells selected, after the data reception by the mobile stations at the specific cell.

* * * * *